United States Patent [19]
Ruiz et al.

[11] Patent Number: 5,865,334
[45] Date of Patent: Feb. 2, 1999

[54] COLLAPSIBLE CONTAINER

[76] Inventors: Diego M. Ruiz, 6749 Conrad Ave., NW., Albuquerque, N. Mex. 87120; Dagoberto D. Ruiz, 1128 Atrisco NW., Albuquerque, N. Mex. 87105

[21] Appl. No.: 925,781

[22] Filed: Sep. 9, 1997

Related U.S. Application Data

[60] Provisional application No. 60/019,034 Sep. 9, 1996.

[51] Int. Cl.⁶ ....................................................... B65D 7/00
[52] U.S. Cl. .................................... 220/6; 220/7; 206/451
[58] Field of Search ..................... 220/1.5, 6, 7; 206/451

[56] References Cited

U.S. PATENT DOCUMENTS

| | | | |
|---|---|---|---|
| 555,241 | 9/1896 | Huffstutler, Jr. et al. | 220/6 X |
| 2,573,089 | 10/1951 | Armenia . | |
| 2,868,406 | 1/1959 | Kookogey | 200/7 |
| 3,067,699 | 12/1962 | Fredriks . | |
| 3,809,278 | 5/1974 | Csumrik . | |
| 3,847,091 | 11/1974 | Holt . | |
| 3,870,185 | 3/1975 | Sanders et al. | 220/6 |
| 3,955,676 | 5/1976 | Hansen et al. | 206/451 |
| 3,963,122 | 6/1976 | Pater et al. . | |
| 3,964,608 | 6/1976 | Rowley . | |
| 4,044,910 | 8/1977 | Box . | |
| 4,278,171 | 7/1981 | Millhoan | 206/451 |
| 4,300,695 | 11/1981 | Hsu | 200/7 X |
| 4,360,298 | 11/1982 | Fischer | 206/451 X |
| 4,506,798 | 3/1985 | Goutille . | |
| 5,154,310 | 10/1992 | Massey | 206/451 X |
| 5,190,179 | 3/1993 | Richter et al. . | |
| 5,466,104 | 11/1995 | Gatwood . | |
| 5,601,202 | 2/1997 | Meacham et al. | 230/6 |

FOREIGN PATENT DOCUMENTS 2039850  8/1980  United Kingdom .

*Primary Examiner*—Steven M. Pollard
*Attorney, Agent, or Firm*—Michelle L. Johnson

[57] ABSTRACT

The present invention is a self-contained, six sided, reusable container for goods, having both an assembled form and a collapsed form. The container includes a bottom, a top, two ends, and two sides. In the collapsed form, the ends and sides are stored between the top and bottom, thus achieving the desired low return ratio to promote reuse of the container. Preferably, the ends are hinged to the bottom and fold inwardly onto the bottom. The sides and ends are interconnected while the container is in its assembled form. This interconnection is achieved using a corner hook latching mechanism that is easily attached and detached. The latching mechanism has the useful property of forming a connection on both sides of the structure, thus allowing the front side of the container to be stored by connecting it to the back side, even when the back side is attached to the ends. Such storage is particularly useful during unloading of the container contents. The preferred embodiment of the container is structured such that multiple containers, either assembled or collapsed, can be stably stacked because the top and the bottom nest. Preferred embodiments of this invention include load isolation systems which allow loads to be safely placed within the container and effectively deflect external forces away from the load during transport.

19 Claims, 16 Drawing Sheets

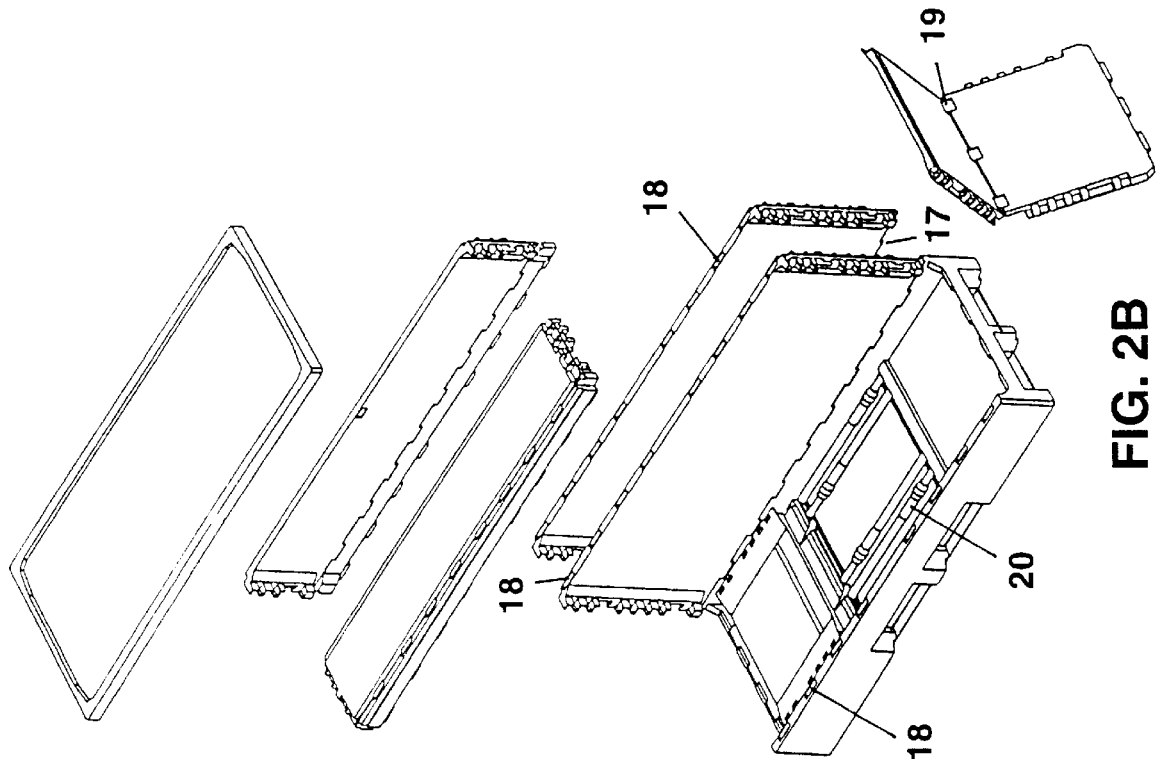
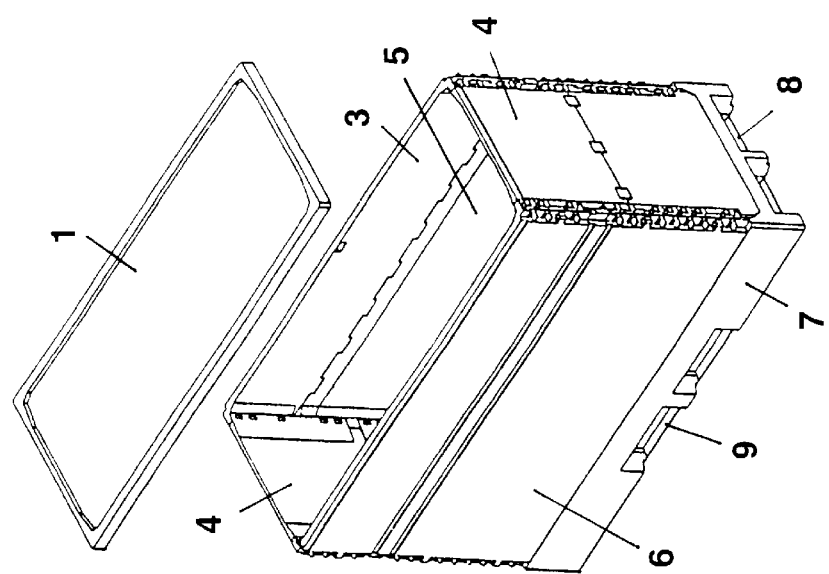

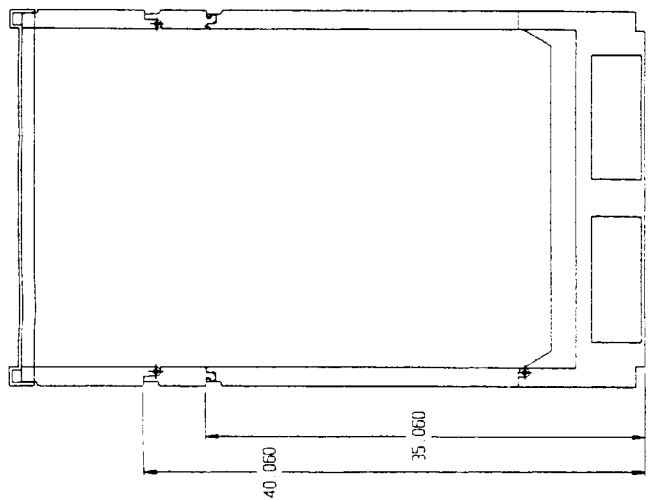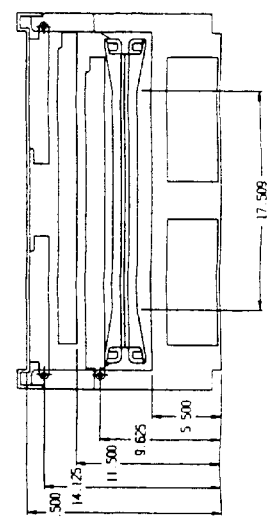
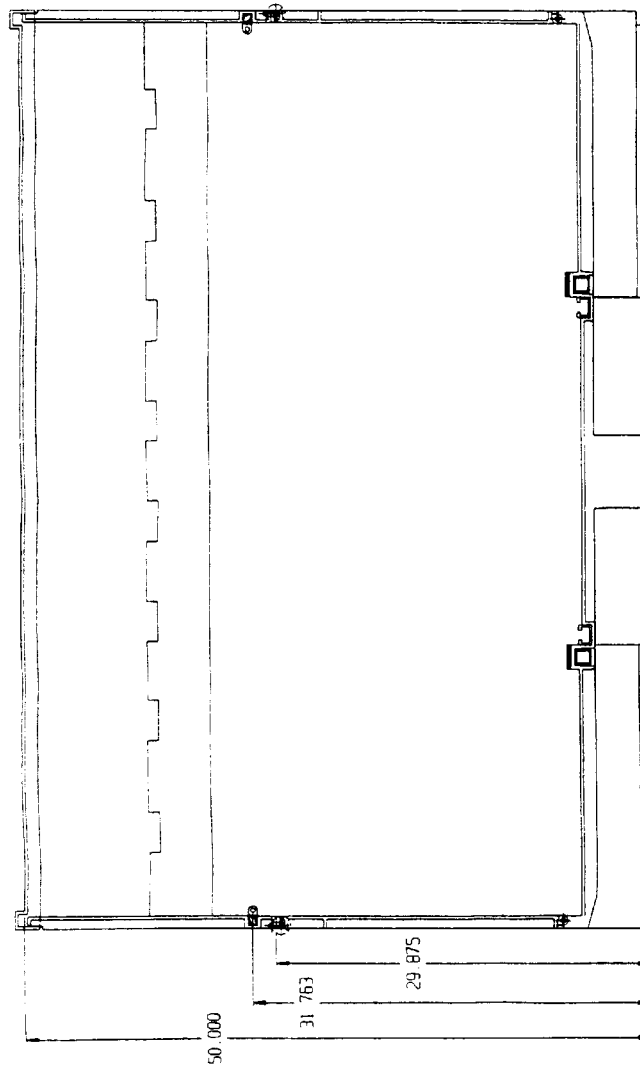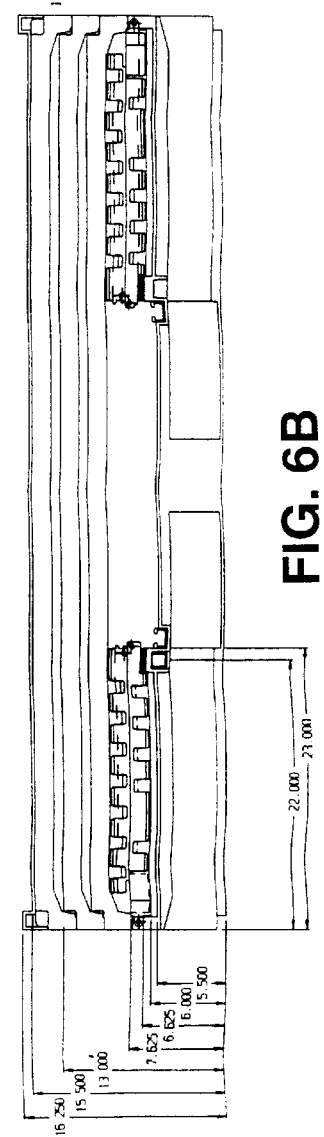
FIG. 6A
FIG. 6B

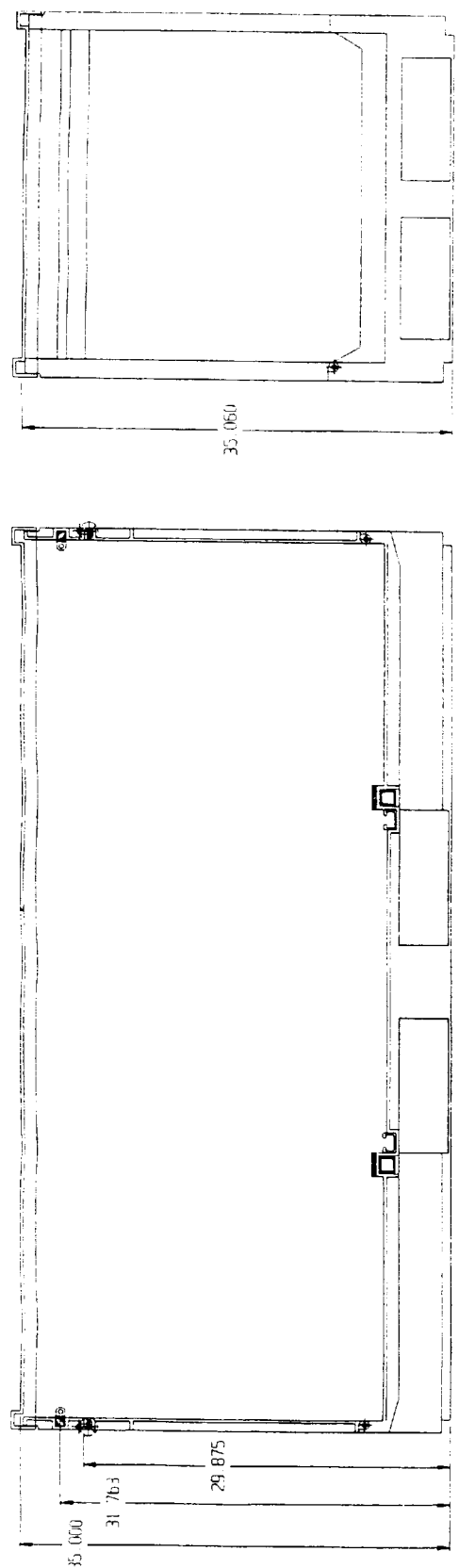
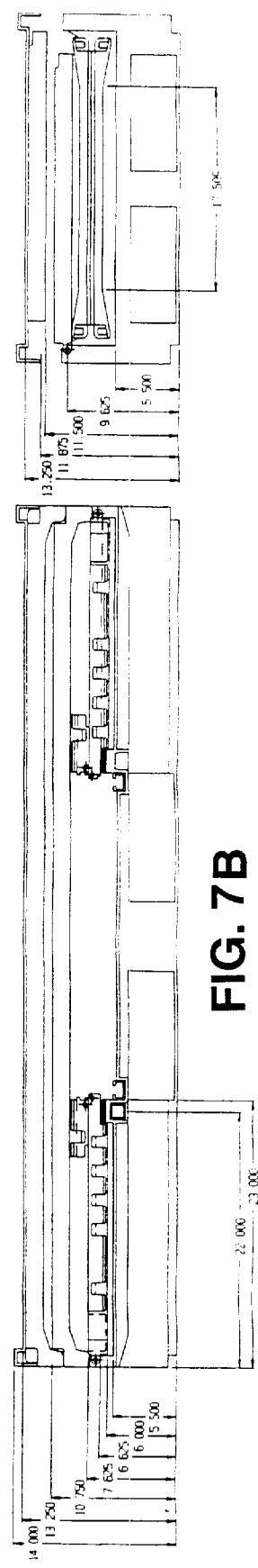
FIG. 7A
FIG. 7B

COLLAPSIBLE CONTAINER

This application claims priority to U.S. Provisional application Ser. No. 60/019,034, filed Sep. 9, 1996.

FIELD OF THE INVENTION

The present invention relates to collapsible containers of the type generally known as knockdown boxes, crates or pallets that may be readily assembled and disassembled by a single individual without employing complex or undesirable fastening means such as nails or screws.

BACKGROUND OF THE INVENTION

As long as industry has shipped products, it has been faced with the problem of what to do with the shipping container once the product has been received. Once the goods or products are removed from their container, typically it is either discarded entirely or shipped back to the manufacturer. Should the receiver of the product decide to discard the shipping container, the results are increased loads on an already overburdened landfill system, temporary storage, and related labor costs. Should the receiver decide to return or reuse the container, costs will be incurred with regard to reassembly, and shipping. Typically, it has been inefficient to return empty containers to their origin because their large volume prevented returning them in large quantities. Thus, it has been a goal in the art to achieve a desirable return ratio, i.e., a ratio reflecting as great a difference as possible between the assembled and collapsed volume of the shipping container. Additionally, the containers tend to lose structural integrity with each repeated use and will eventually reach a point after which it will be rendered useless. The utilization of plastics with high strength to weight ratio which are recyclable has been used in the art to overcome this weakness.

Shipping containers have typically been constructed of materials such as wood or paper (particularly cardboard), the use of which has fallen into public disfavor because of their impact upon the environment. Industry has incurred additional costs in shipping due to heightened environmental sensitivity and increased costs of raw materials. The use of recyclable plastics for shipping containers also overcomes this concern.

Many of the above described difficulties are exacerbated if the materials to be shipped are glass windshields. The general difficulty in safely shipping glass, plus the great variety of windshield shapes and sizes, makes it very difficult to design a container that will safely accommodate such variations. Furthermore, recent development in car designs, such as the aerodynamic Ford Windstar van, have increased windshield heights to approximately 48 inches tall. Future windshield designs are sure to further increase windshield heights as more and more of the front of the car is glass. In shipping windshields, it is also essential that outside forces on the shipping crate, such as those which occur during shifting of loads in transit, stacking of containers, and loading and unloading with forklifts are deflected as much as possible from the container contents. As such, methods of shipping windshields of all sizes safely, while still achieving the desired return ratio, are currently desired in the art. Such containers would also be useful for shipping other fragile materials such as plate glass, computers, or any material where forces must be deflected away from the contents.

Collapsible, reusable shipping containers are known in the prior art. U.S. Pat. No. 3,809,278 to Csumrik discloses a collapsible container in which the component parts may be conveniently stored between the lid and the base, as illustrated in FIG. 3, thereof U.S. Pat. No. 4,044,910, to Box discloses a crate for shipping produce which includes a base, two inwardly folding side walls, and two inwardly folding end walls. Each of the side and end walls is hinged near the base of the crate. A shipping container which can be disassembled and stacked together for shipping and storage is disclosed by Goutille in U.S. Pat. No. 4,506,798. The fastening devices, which when assembled, hold the side panels to the base and to the roof and can also be used to fasten the roof directly to the base when the container is collapsed. While it is intended that the sides be sandwiched between the base and roof when in this collapsed state, the roof is directly attached to the base, regardless of whether or not the sides are positioned there between. Richter, et al., U.S. Pat. No. 5,190,179, discloses a container in which the sides collapse inward in an accordion like fashion. Finally, while not collapsible, U.S. Pat. No. 3,963,122 discloses a container for shipping automotive backlights which includes an adjustable back support and inflatable member to hold the backlights in place. None of these containers of the prior art overcome the difficulties discussed above, particularly as applied to shipping of fragile materials such as windshields, plate glass, computers, or other delicate machinery.

SUMMARY OF THE INVENTION

The present invention is a self-contained, six sided, reusable container for goods, having both an assembled form and a collapsed form. The container includes a bottom, a top, two ends, and two sides. In the collapsed form, the ends and sides are stored between the top and bottom, thus achieving the desired low return ratio to promote reuse of the container. Preferably, the ends are hinged to the bottom and fold inwardly onto the bottom. The sides and ends are interconnected while the container is in its assembled form. This interconnection is achieved using a corner hook latching mechanism that is easily attached and detached. The latching mechanism has the useful property of forming a connection on both sides of the structure, thus allowing the front side of the container to be stored by connecting it to the back side, even when the back side is attached to the ends. Such storage is particularly useful during unloading of the container contents. The preferred embodiment of the container is structured such that multiple containers, either assembled or collapsed, can be stably stacked because the top and the bottom nest.

Included in a preferred embodiment of the container are a series of mechanisms designed to pull and maintain the loaded materials into a vertical shipping position. This position isolates the load from force placed upon the outside of the container and holds the load securely during transport. An internal structure of four struts is preferred with each strut able to be positioned both horizontally and vertically to accommodate different sized loads. Security during loading and unloading is also insured in the preferred embodiment by adjustable rear strut props which hold the strut in the correct position relative to the rear side wall. A series of prop positions are possible, and the choice is affected by the horizontal position of the struts, which is, in turn, affected by the shape of the load within the container. In the preferred embodiment, the load is also protected from damage through lateral displacement by cargo straps on either end of the container, where one end of the strap is permanently attached to the end wall, while the other end can be latched to the other opposite end wall in one of a series of positions, again to accommodate different sized contents.

The collapsible container may also include sides and ends which include first and second sections and means. By having several sections, the first sections to be moved relative to the second sections. Addition of the hinged second sections, or extensions, increases the distance between the top and the bottom, thereby increasing the container height and volume. The configuration of the first and second sections, such as the particular height of the extension and the use of hinges, allows the container to be collapsed with a suitable return ratio.

BRIEF DESCRIPTION OF THE DRAWINGS

FIG. 2A is a perspective views of the extended (50 inch) collapsible container of the present invention in its assembled state. FIG. 2B is a perspective view of the container in its partially dissembled state.

FIG. 6A is a vertical cross section view of the double height (50 inch) container of the present invention in its assembled state. FIG. 6B is a vertical cross section view of the container in its collapsed state.

FIG. 7A is a vertical cross section view of the standard (35 inch) container of the present invention in its assembled state. FIG. 7B is a vertical cross section view of the container in its collapsed state.

DESCRIPTION OF THE PREFERRED EMBODIMENT

Figure 1B:
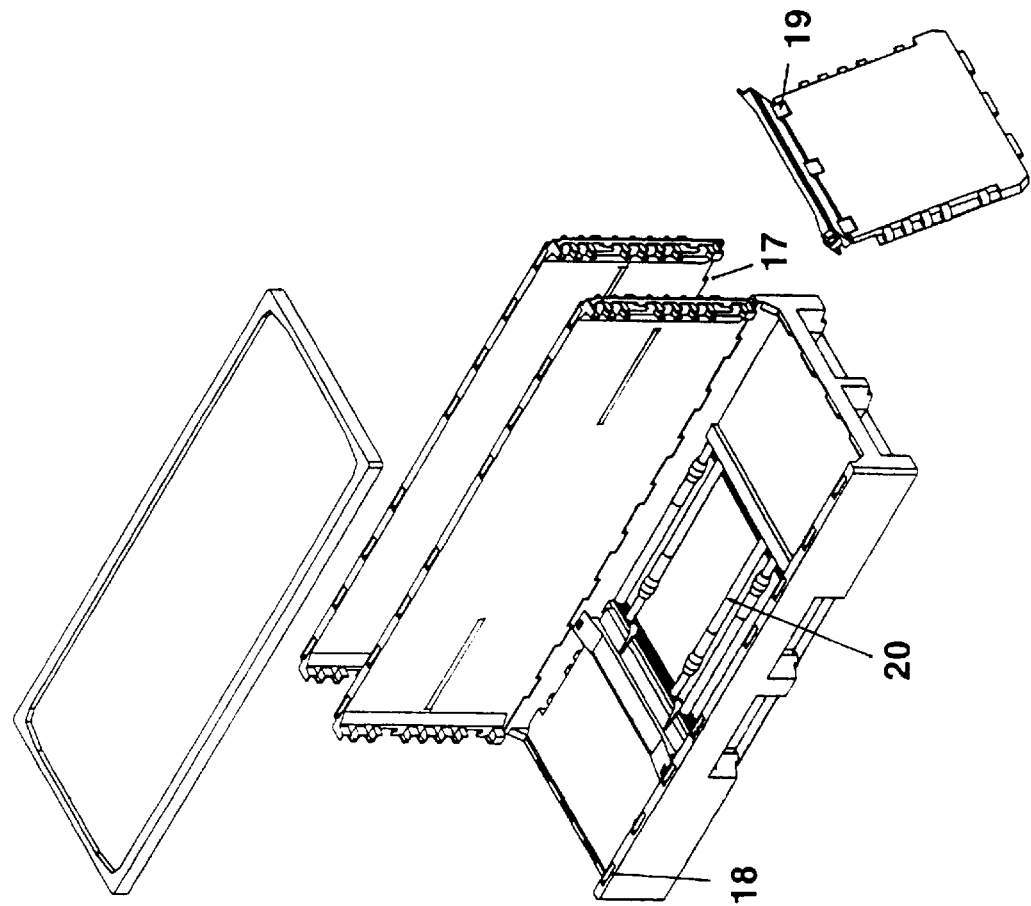
FIG. 1B is a perspective view of the container in its partially dissembled state.
Figure 1A:
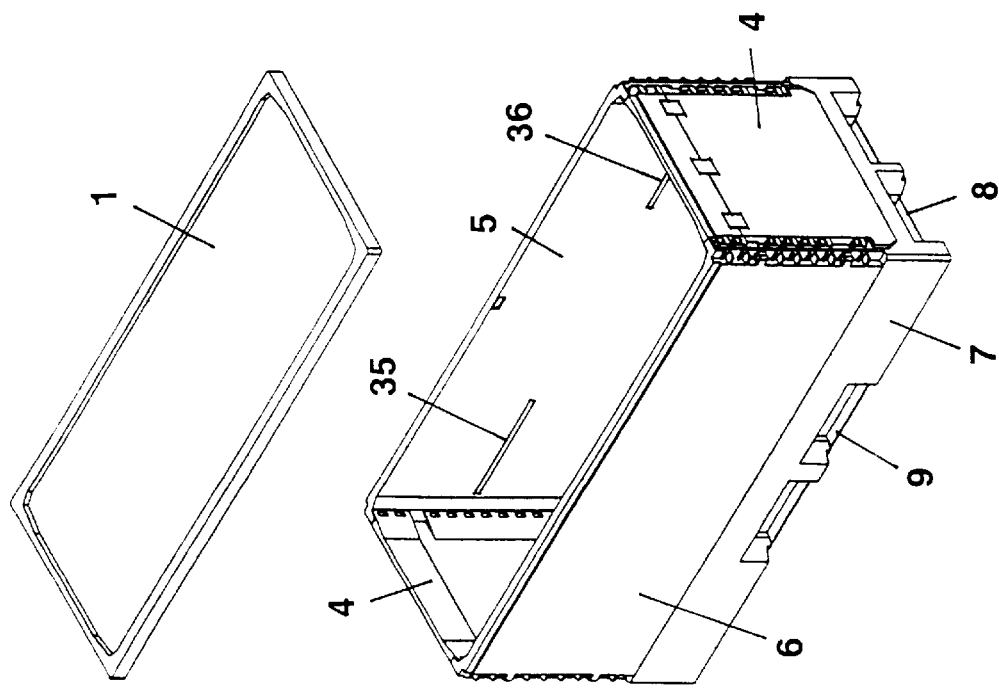
FIG. 1A is a perspective views of the standard (35 inch) collapsible container of the present invention in its assembled state.
Figure 1C:
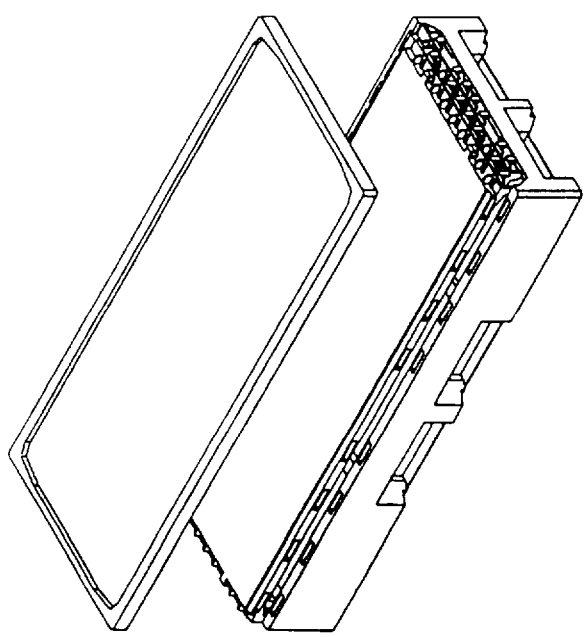
FIG. 1C is a perspective view of the container in its collapsed state.
Figure 2C:
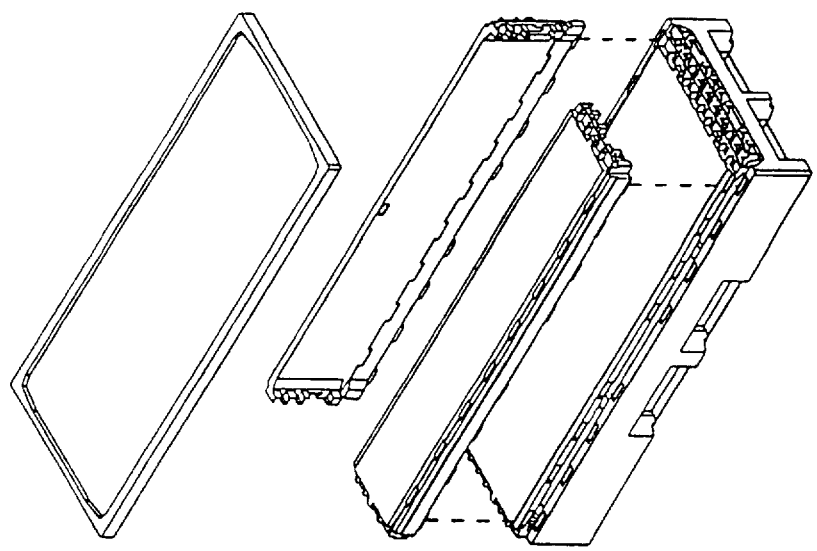
FIG. 2C is a perspective view of the container in its collapsed state.
Figure 3:
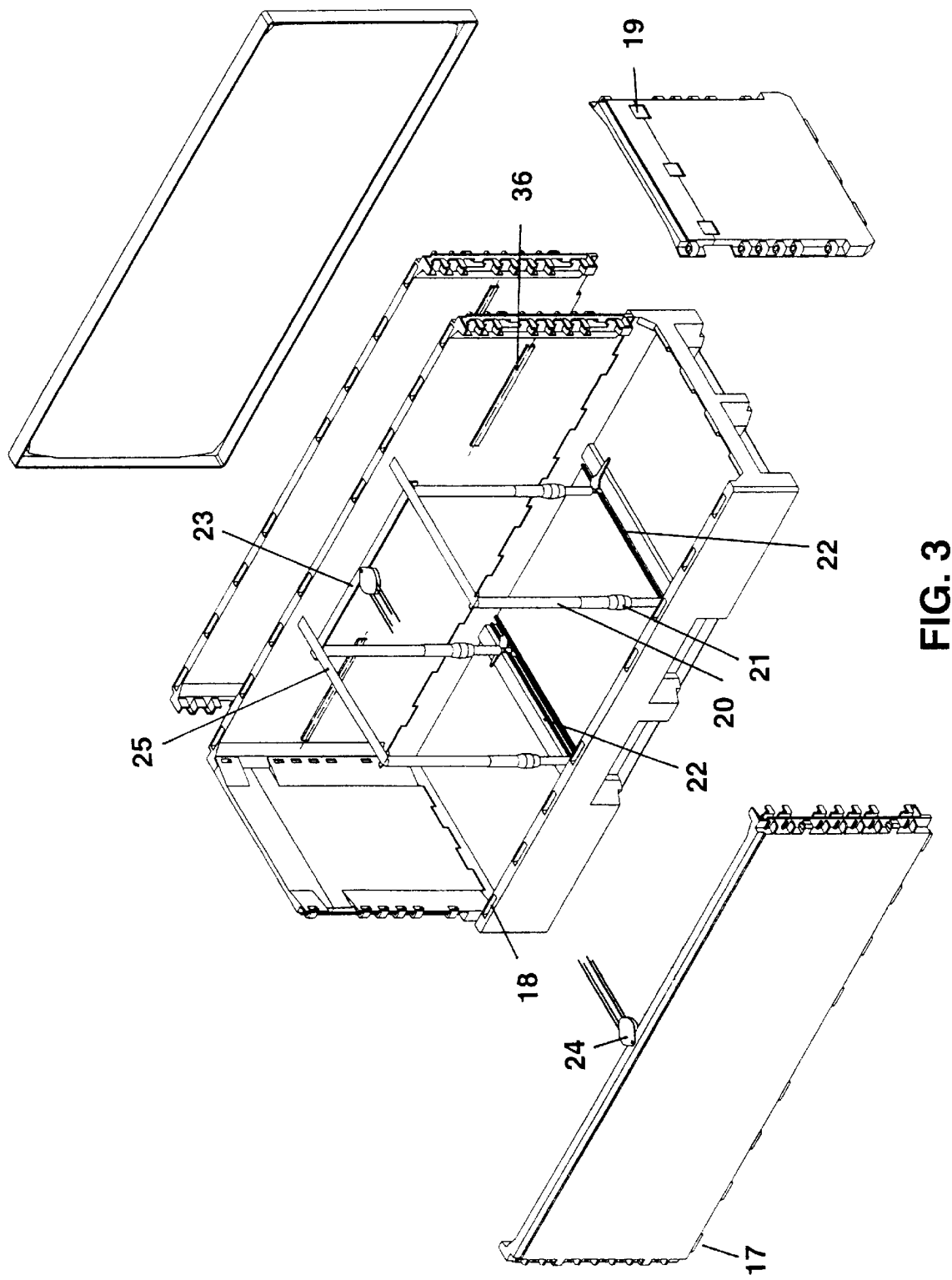
FIG. 3 is an exploded view of the assembled single height (35 inch) container of the present invention, detailing the structure of the load isolation system.
Figure 5:
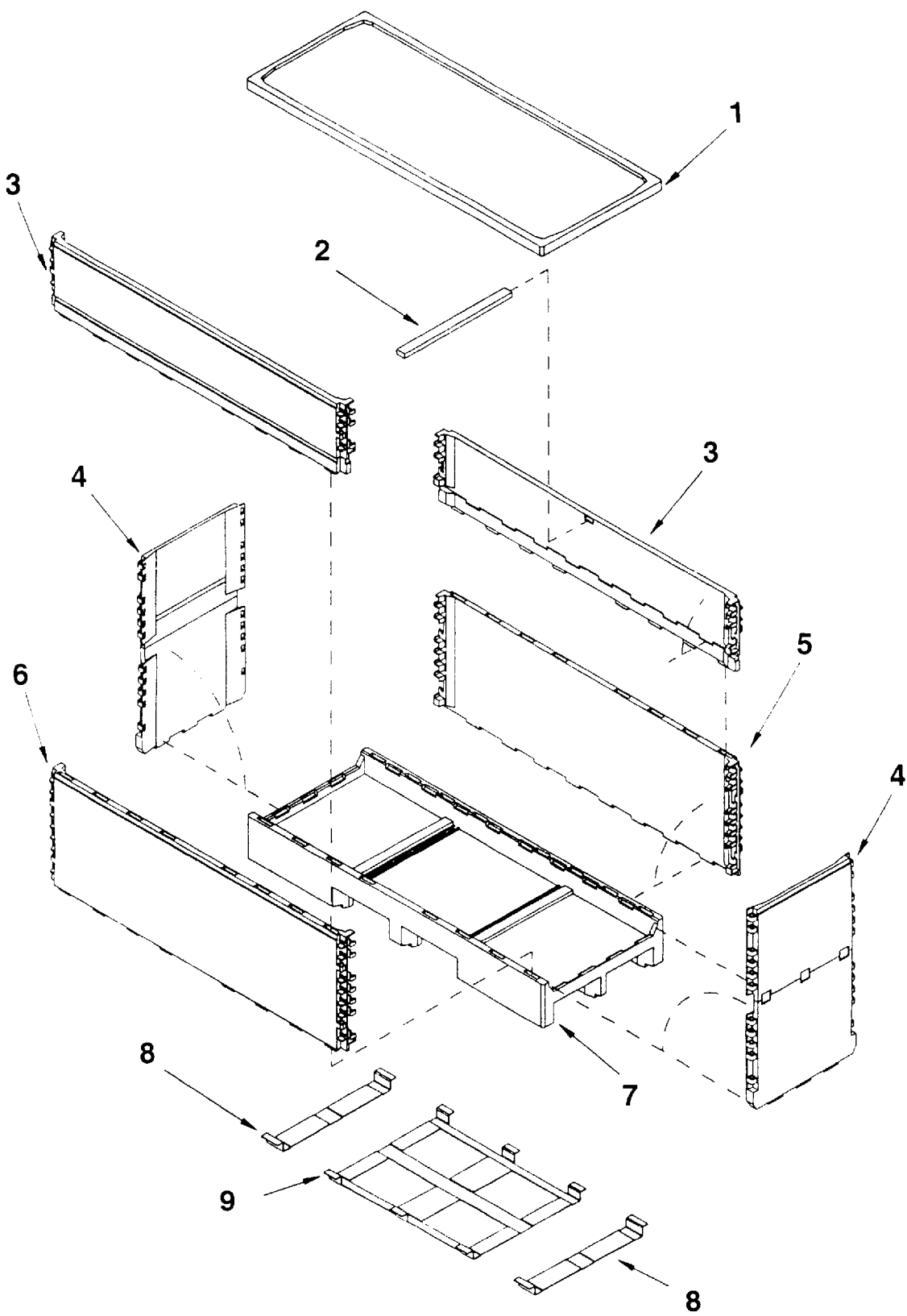
FIG. 5 is an exploded view of the assembled extended (50 inch) container of the present invention.

With reference to FIG. 1, the standard (35 inch) container of the present invention includes a bottom 7; a removable front side 6; a hinged and removable back side 5; two end walls 4 with approximately 5 inch hinged extensions; a top 1; an end fork strap 8; and a center fork strap 9. As shown in FIG. 1 and 5, the front side is connected to the bottom by elongated tabs which fit into grooves present in the bottom, while the back side is connected to the bottom using a simple hinge structure. The two ends are connected to the bottom using a hinge structure. With reference to FIG. 2, the extended (50 inch) container of the present invention includes the above components and, additionally, includes two approximately 15 inch hinged side extension walls 3, which include a relatively short (5 inch) lower part and a relatively long (15 inch) upper part, where one hinged extension is attached to the top of the front side 6 and the back side 5; two approximately 20 inch hinged end extension walls 4; and a spreader bar 2 (shown only in FIG. 5).

The structural components of the container of the present invention, such as the bottom 7, top 1, sides 5, 6, ends 4, and extensions 3 can be made of a variety of materials, preferably those which have a high strength to weight ratio. Examples of such materials include aluminum and various types of plastics, such as high density polyethylene. In order to decrease the environmental impact of the container, the use of recycled plastics, such as commodity resin or engineered resin, is highly preferred when constructing components of the present container. In general, the sides and ends of the container can be of any construction which maintains sufficient structural rigidity to ensure the integrity of the container during shipment. Thus, the walls can be solid, as illustrated, or can include a honeycombed structure either alone or in combination with a solid backing. The structure utilized should take into account the contents which are to be shipped and the possible need for shelter of the contents before, during, or after shipment.

The end fork strap 8 and the center fork strap 9 can be made of the same or differing material from the structural components of the container, although metal, such as steel, is generally preferred. The purpose of the straps is to reinforce the base and allow for access and handling of the container by a forklift without damage to the container or its contents. The end fork straps 8 also prevent the container from toppling when being transported by a forklift. Thus, the choice of a material for the straps should be one which effectively avoids such damage.

Figure 8:
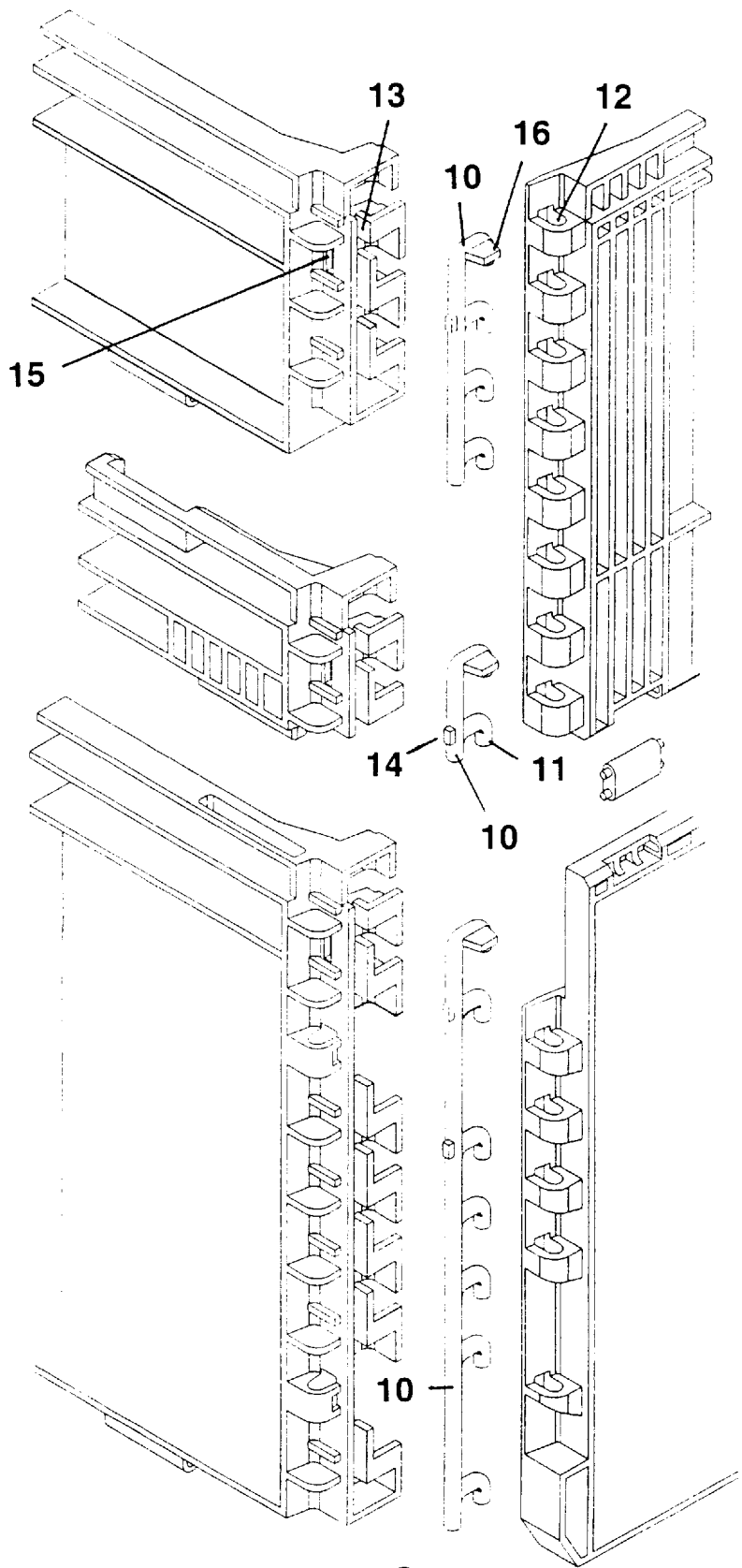
FIG. 8 is an enlarged perspective view of the right-hand corner of the container of FIG. 2, showing the components of the corner hook latching mechanism.

As illustrated in FIG. 8, the corners of the container utilize a corner hook latching mechanism which includes a latch rod 10 with a series of hooks 11. The rod 10 is preferably about one-half inches in diameter and runs the length of the corner, approximately 2 feet for a 35 inch container. When the hooks 11 are engaged into the C-shaped recesses 12 in the panel to be connected, the mechanism forms a type of mortise and tenon connection, with the hook 11 functioning as the tenon and the C-shaped recess 12 functioning as the mortise. The rod 10 travels up or down approximately one-half inch within a cavity 13 at each end of the front and back sides. It is kept in the cavity by small tabs 14 in the rod 10 which fit into holes 15 within the cavity 13 structure. The holes 15 are elongated to allow for the travel of the tab 14. There is a large tab 16 located at the top of each of the rods 10 which can be either depressed or lifted to engage or disengage the hooks 11 from the C-shaped recess 12. When the rod 10 is in its lowered position the front or back side and the end are securely connected, in the raised position the side and end are able to be moved independently of one another. The 50 inch embodiment has three latch rods 10 in the corner mechanism to maintain the ability to move the upper part of the extension 3 in relation to the side wall 5, 6. If only the upper part of the extension is to be swung out, for example, when unloading, only the top two latch rods 10 are lifted to allow the extension 3 to be moved, while the lower rod 10 maintains the connection of the side 5, 6 with the end 4.

A useful feature of the corner hook latching mechanism is that the connection areas of the sides are constructed in such a way to allow a connection to form on either face of the connecting area. Essentially, the C-shaped recesses 12 of the ends 4 have been duplicated on the outward face of the side 5, 6 connection area. Thus, the front side 6 and back side 5 can be connected to each other front to back, even if one side remains connected to the end walls 4. This double connection feature is illustrated in FIGS. 1B and 1C and FIG. 2B and 2C, and can be utilized while the container is being transported (partially collapsed), being loaded, being unloaded of its contents, and during collapse of the container for return. The back side 5 is preferably hinged at its connection point with the container bottom, as this allows the container to remain structurally stable when the front side 6 is removed and placed on the back side 5. Because structural stability is provided by the back side 5 being hinged and ability to easily remove the front side 6 for unloading is important, it is preferred that the front side be interlocked to the bottom by a series of elongated tabs 17 placed at equal distances along the bottom edge of the front side 6. These tabs fit into grooves 18 placed at equal distances along the top edge of the bottom 7 of the container.

The standard size of the present invention is approximately 35 inches high, which has a 5 inch extension height on the ends 4 and no extension on the sides 5, 6, which is illustrated in FIG. 1. The addition of longer extensions can increase the height of the container in approximately 5 inch increments. For example, the standard height can be increased to a maximum height of about 50 inches with the use of a 20 inch extension on the ends 4 and a 15 inch extension on the sides, 5, 6 as illustrated in FIG. 2. Use of end extensions of 10 inches with side extensions of 5 inches results in a total container height of 40 inches and use of end extensions of 15 inches with side extensions of 10 inches results in a total height container height of 45 inches. The extension of the end panel 4 is attached by toggle hinges 19 which will allows the extension to be rotated back 180 degrees without binding. This is done to provide adequate storage volume for the load isolation system, described below, when the container is collapsed. Also as discussed more fully below, all the containers from 40 to 50 inches collapse to the same return ratio.

FIGS. 1 and 2 illustrate the perspective view of the container of the present invention in its collapsed state, while FIGS. 6 and 7 illustrate sectional views of this arrangement. The design of the present invention results in a desirable return ratio without sacrificing the total volume available in the container in its assembled form. Specifically, the standard size container (35 inch) collapses down to a height of approximately 13.25 inches, resulting in a return ratio of approximately about 1:2.6. This efficient packing is achieved by the inward fold of the end panels, as illustrated in FIG. 7. Note that to accommodate the load isolation system in the preferred embodiment, it is necessary that the end panel 4 include an approximately 5 inch hinged extention that folds back upon the end wall upon collapse of the container. This inward folding system of the end panel 4 allows for an increase in container height of up to 50 inches before the entire space in the collapsed container is utilized. Containers of 40, 45, and 50 inches have a collapsed height of 15.5 inches, resulting in return ratios of about 1:2.6, 1:3, and 1:3.2, respectively. Depending on the actual dimensions of the container and the mechanisms included in their interior and small structural changes, return ratios of about 1:2.6 to about 1:4 are expected for containers of the present invention. The increased collapsed height in the containers of 40–50 inches results from the additional layer formed by the extension of the front side 6 and back side 5 found in containers of these heights and as illustrated in FIG. 6. Increases in height should occur in intervals equal to the distance between the hooks 11 (and, necessarily, the C-shaped recesses 12) of the corner hook latching mechanism to ensure structural integrity of the latched corner. In the preferred embodiment, this distance is 5 inches. If height increase above 50 inches is desired, it may be achieved using an extension ring which would encompass the entire container circumference, but use of an extension ring would necessarily increase the volume of the container in its collapsed state.

Figure 9:
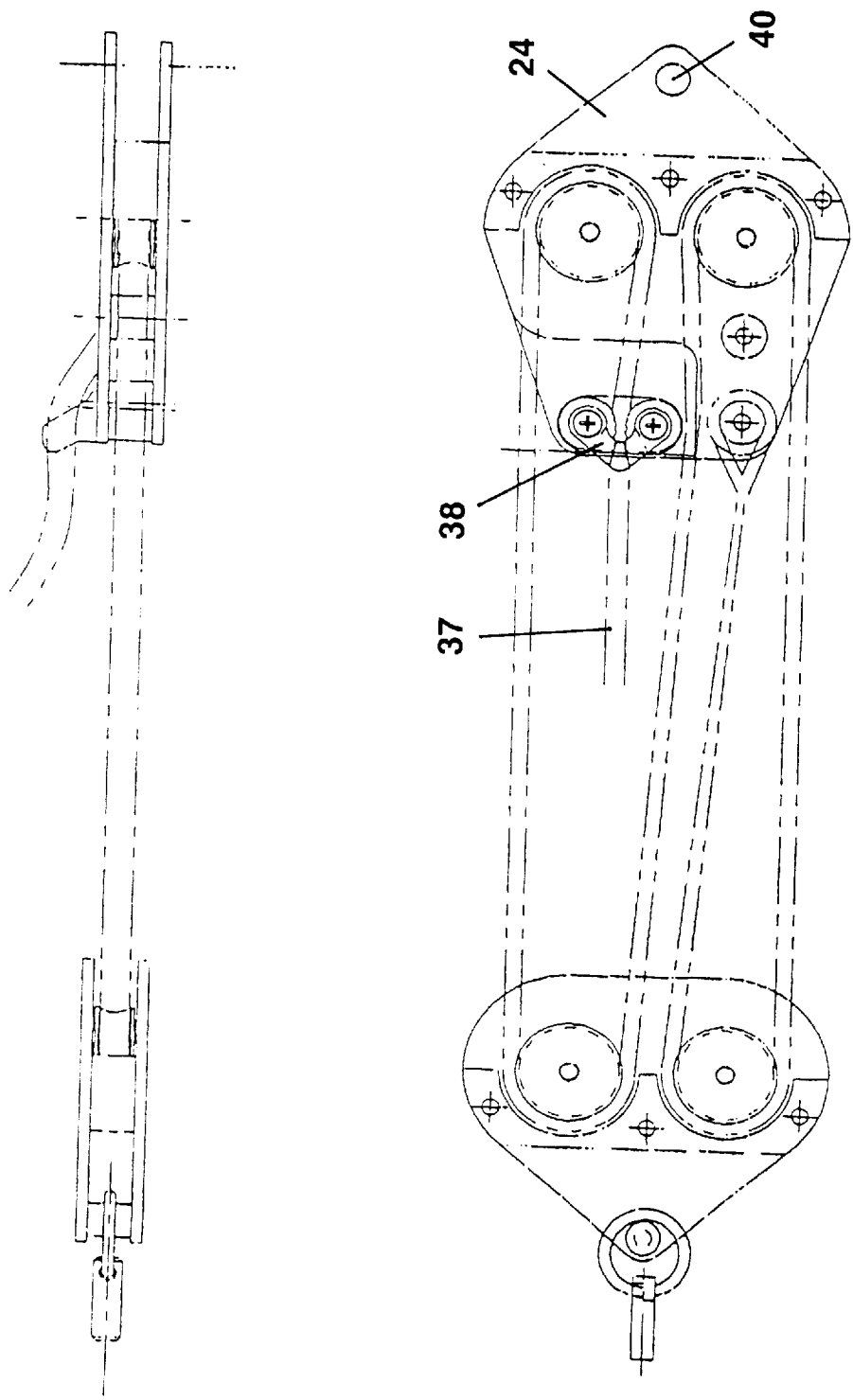
FIG. 9 is a detail of the internal block and tackle system present in a preferred embodiment of the invention.

The preferred embodiment of the present container includes a load isolation system which allows a single individual to lift a significant load from a controlled loading angle into a vertical transport position and then back again. The load isolation system comprises four telescoping struts 20, a cross-bar 23, a block and tackle arrangement 24, and straps 25 which connect the front struts at either end of the assembled container. Illustration of the position of the block and tackle 24 relative to the assembled container is found in FIG. 4, while a detail of the block and tackle 24 arrangement is found in FIG. 9. If the load is windshields, it is anticipated that the container will hold up to 30–40 units, depending on the shield curvature. The block and tackle allows up to about 40 shields to be lifted from a controlled loading angle, preferably about 7° from vertical, to a vertical position. The mechanical advantage provided by this block and tackle is 5:1 based upon the use of four pulleys and one secured line on the block. The windshields can be locked in a vertical transport position by placing the unsecured end of the rope 37 into a cam cleat 38. Transporting the windshields in a vertical position does not subject any one windshield to the weight of the one or more windshields loaded after it. An individual windshield varies, but can be of significant weight. When this weight is multiplied by the 30 to 40 windshields transported within a typical load, it becomes necessary to be able to safely lift a great deal of weight into position for transport. With the load isolation system provided, an individual can easily lift this load into its transport position without risk of personal injury or damage to property and during transport, force upon the sides or ends of the container is effectively deflected away from the load.

Figure 4:
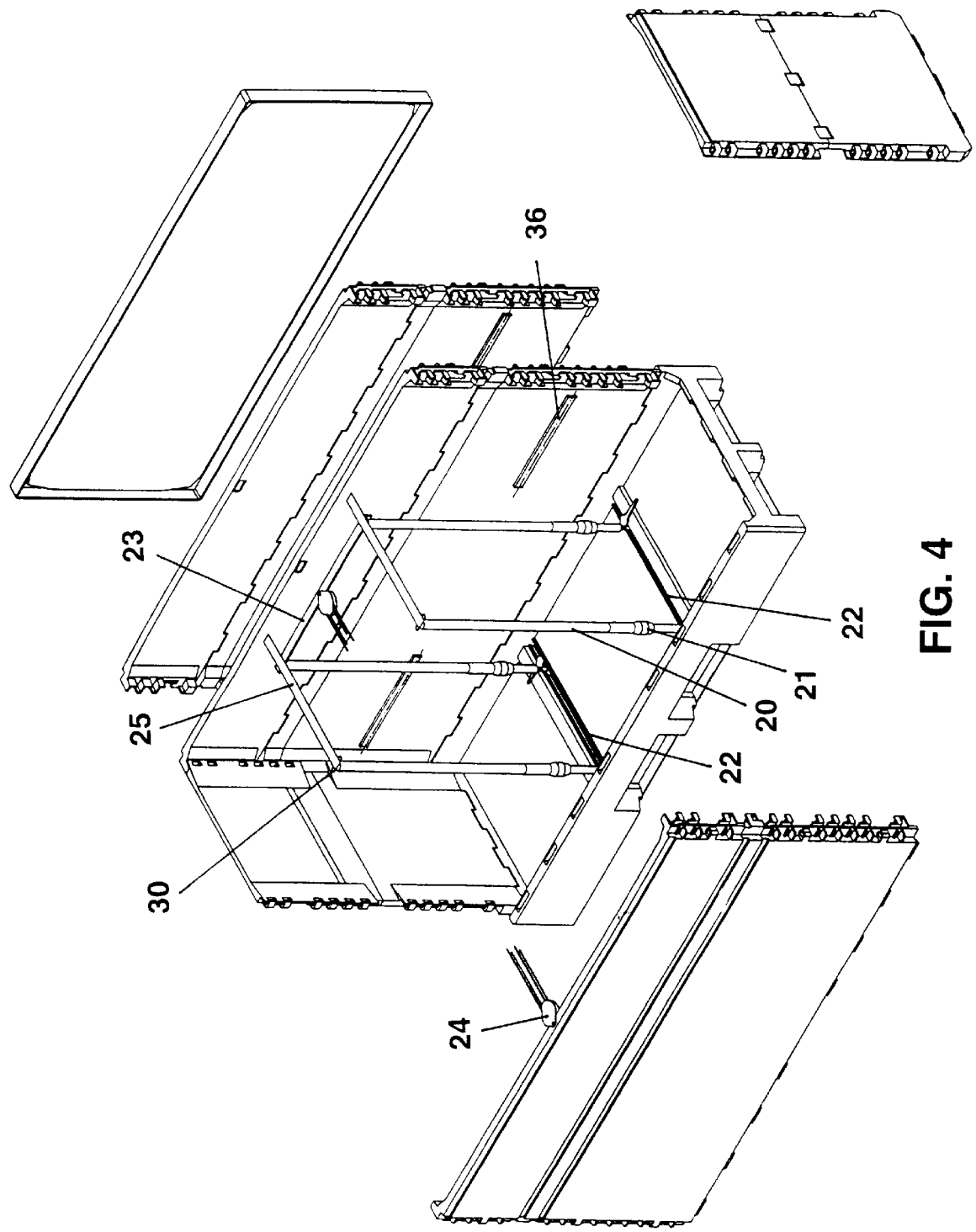
FIG. 4 is an exploded view of the assembled double height (50 inch) container of the present invention, detailing the structure of the load isolation system.

As shown in FIG. 4, the load isolation system uses as key components a series of 4 telescoping struts 20 which, when set and locked into position to accommodate the load being carried, will act as rigid members capable of containing the load and allowing it to be shifted as a single unit. The struts are capable of telescoping in length to accommodate a range of windshield heights. At each desired length, the strut shall be capable of being locked in place, for example, by the use of a cam clamp 21 or a spring button. The struts are adjustable in positioning along two base rails 22 placed along the bottom 7 of the container. Each track has two struts 20 placed into it. One strut 20 will be placed at the rear of the load and the other at the front. Both the front and back struts 20 shall have, at their base, a hinge pin 26 which swivels at their connection within a track adjuster 27. The adjusters have cam lock lever devices 28 with quarter turn locks. The struts 20 shall be capable of being rotated 90 degrees at their connection to the adjuster, which is used when the struts 20 are being placed into the bottom of the container, between the base rails 22, for storage. Padding can be added to the bottom of the struts to cushion any contact between the strut and the load.

Figure 12:
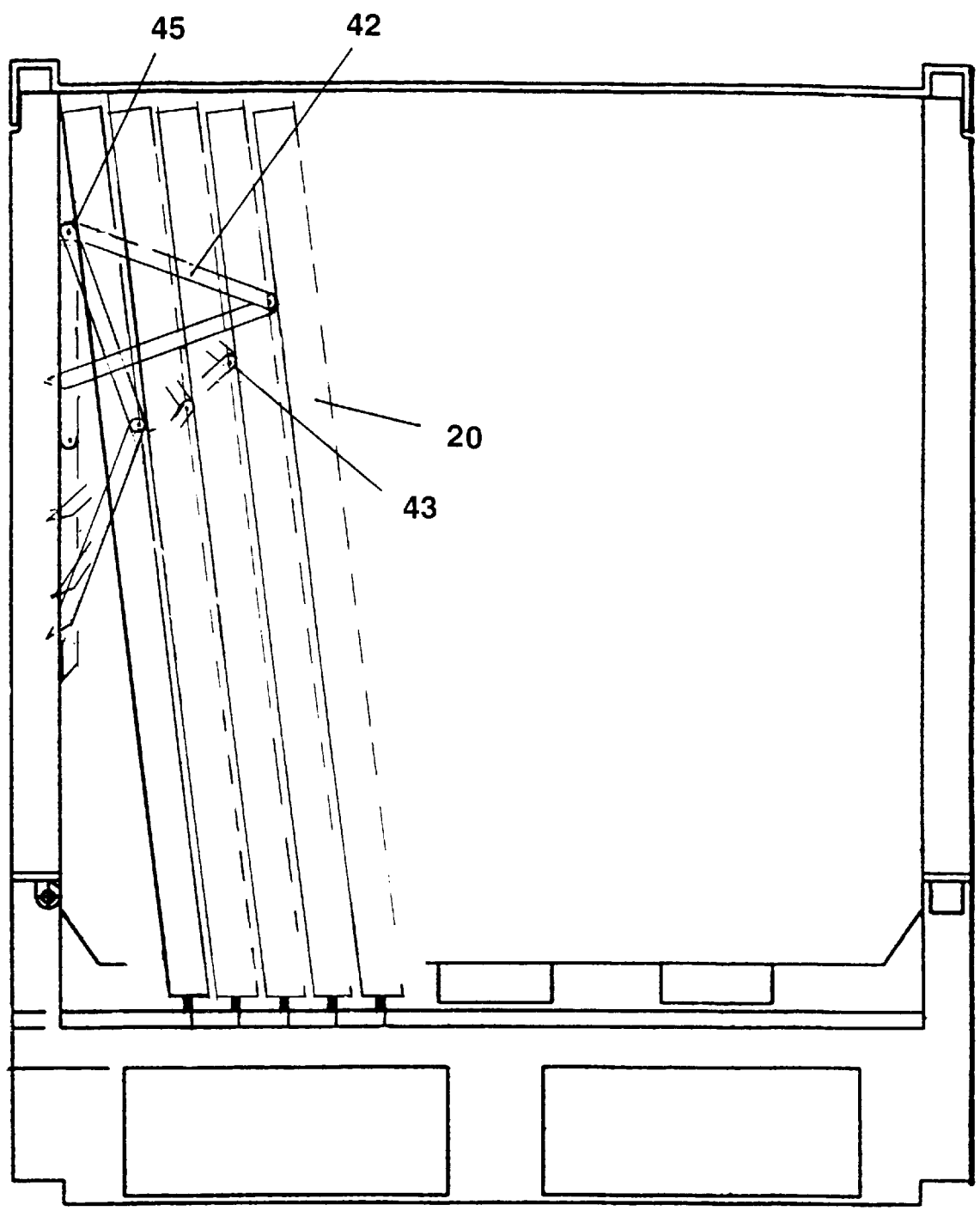
FIG. 12 is a sectional view of the container of FIG. 1, showing detail of the adjustable rear strut prop present in a preferred embodiment.
Figure 13:
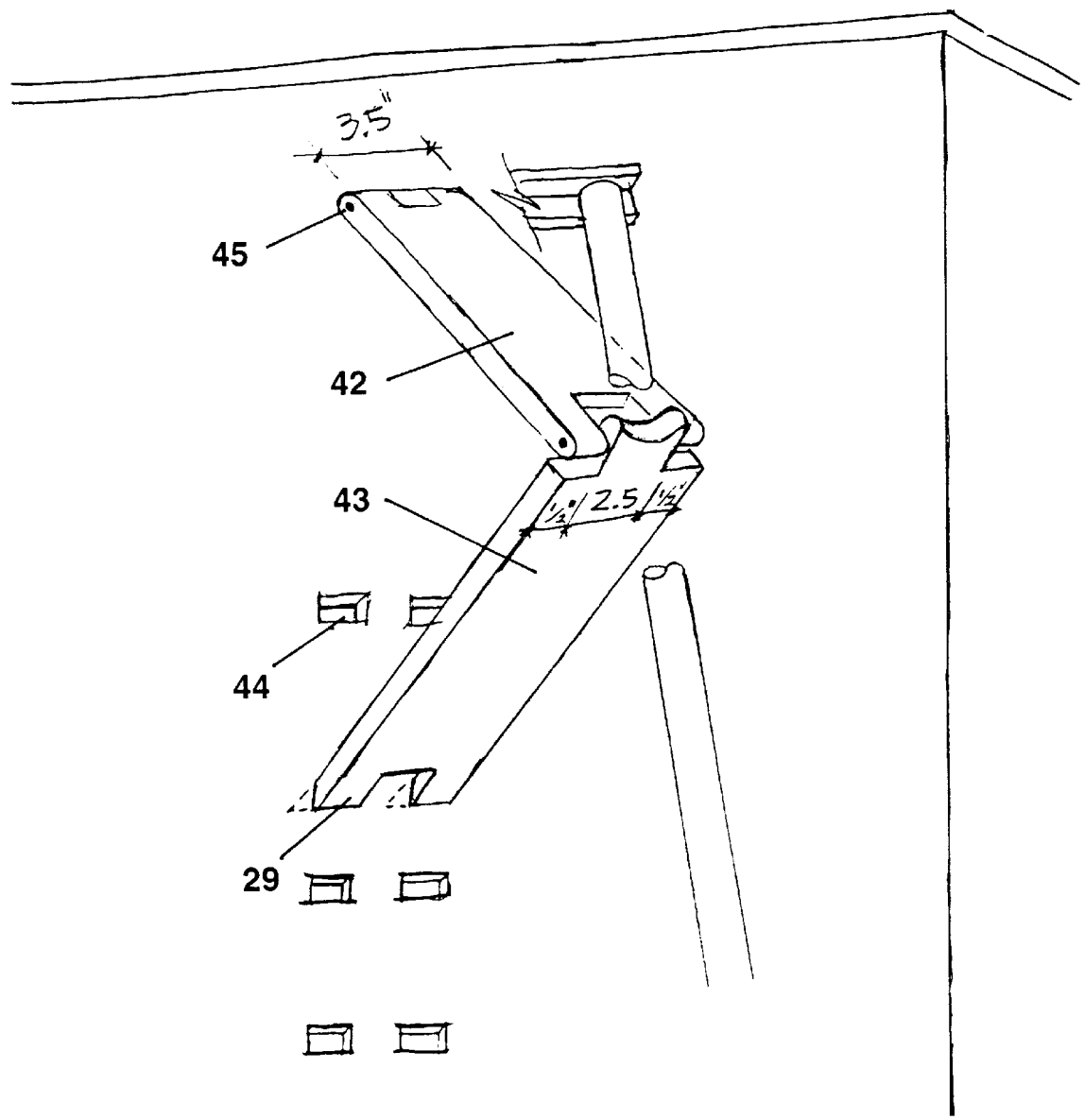
FIG. 13 is a detail of the rear strut prop showing its interaction between with the strut.
Figure 14A:
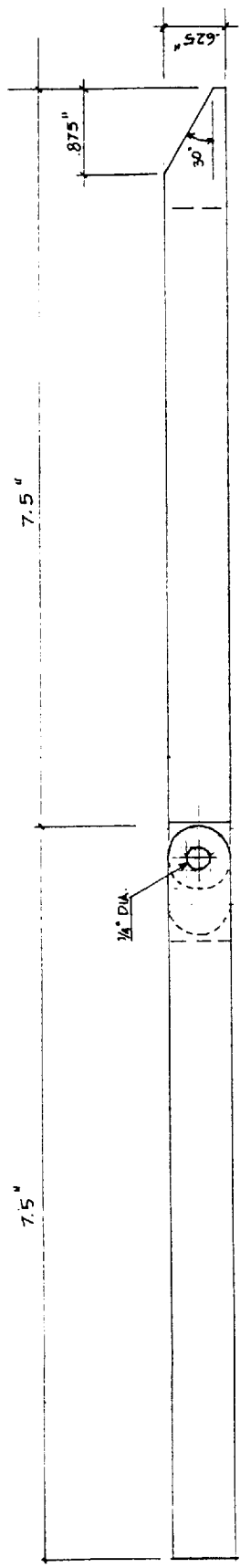
FIG. 14A is a vertical section of the rear strut prop present in a preferred embodiment.
Figure 14B:
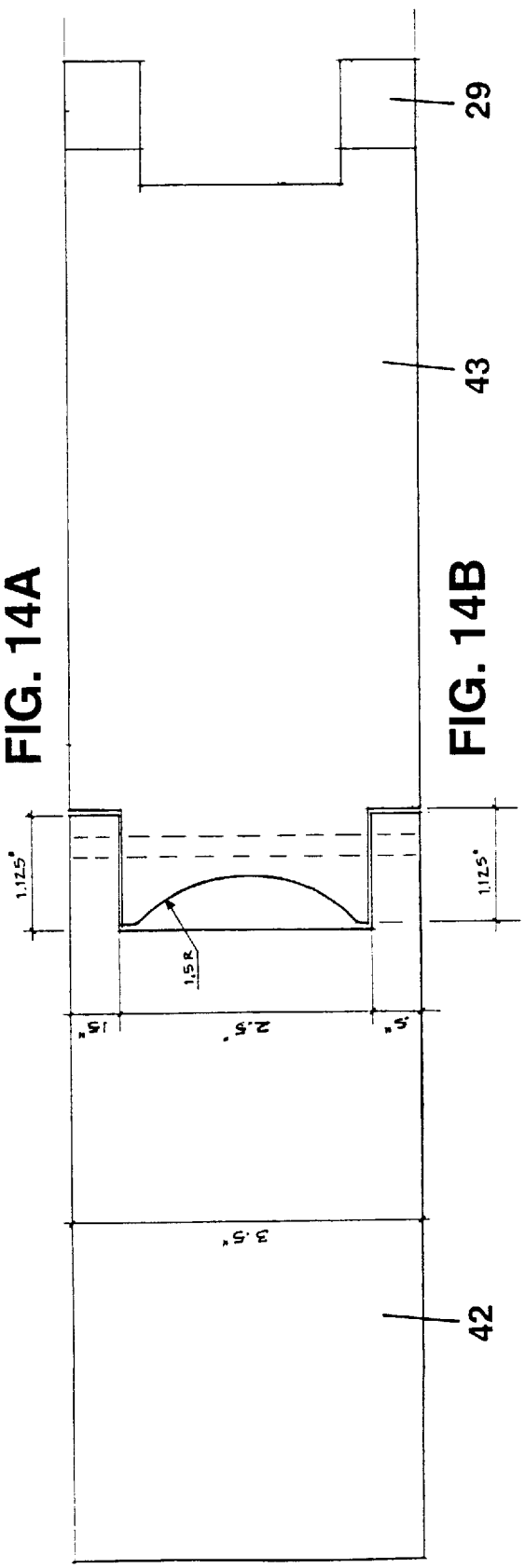
FIG. 14B is a top view of the rear strut prop.

The two rear load struts 20 are maintained at the desired angle for loading, for example, 7° from vertical, by two rear strut props 28 located immediately behind the struts on the rear side wall 5 of the container. A preferred configuration for the strut props is illustrated in FIGS. 13 and 14. As illustrated in FIG. 13, the rear strut props 28 are V-shaped while in use, with the angle maintained by pegs 29 which can be placed in a one of several positions. The correct position for the prop 28 is indicated by the horizontal position of the rear strut 20. FIG. 12 shows that the horizontal positions of the rear strut 20 and the positions of the prop 28 are coordinated, for example, by numbered positions, such that if the rear strut 20 and the prop 28 are in the same numbered position, the strut 20 (and therefore the load) will maintain the desired loading angle.

Figure 10:
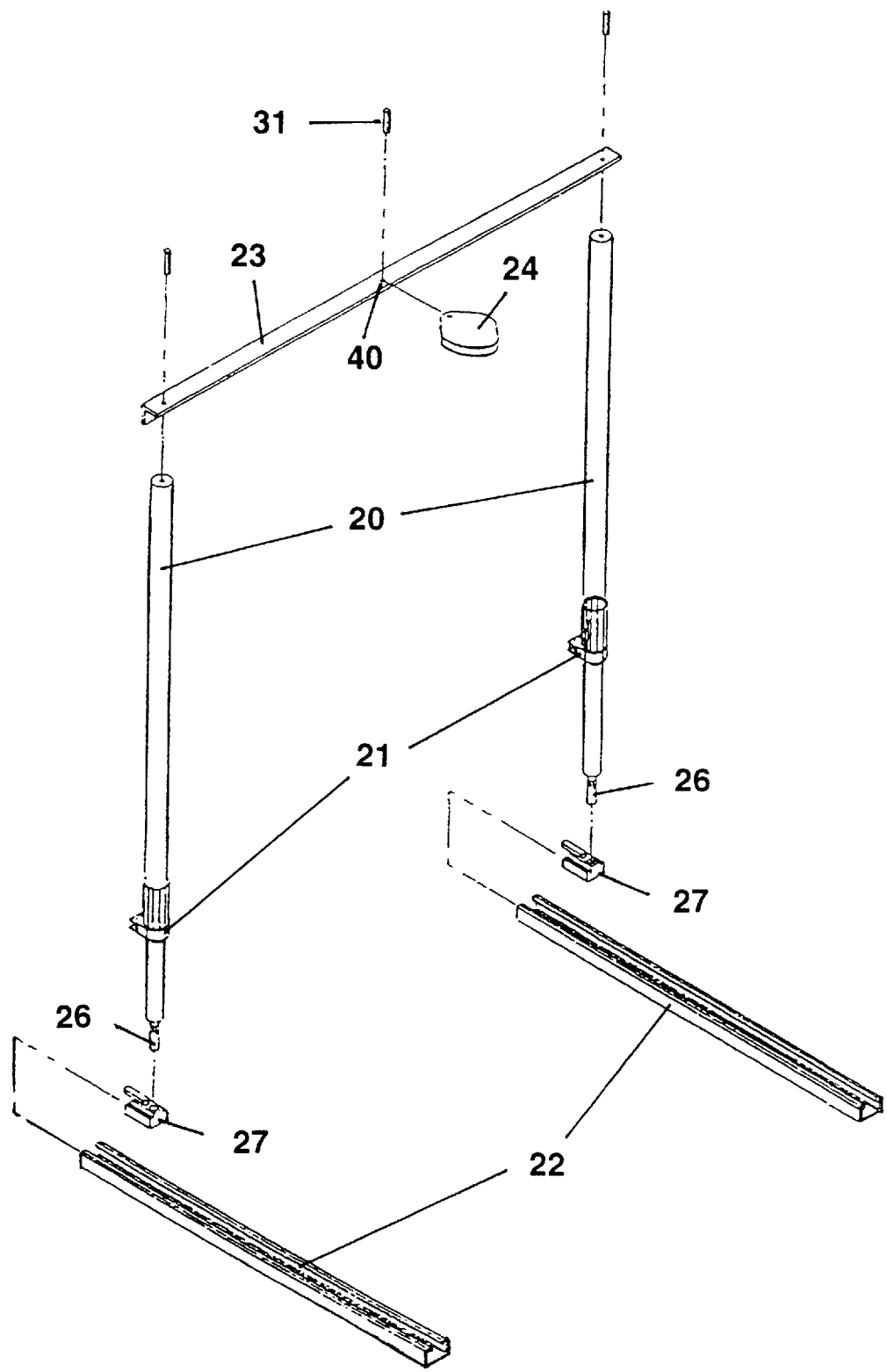
FIG. 10 is an exploded view of the telescoping struts and adjustable positioning track present in a preferred embodiment which supports the internal block and tackle system of FIG. 9.
Figure 11:
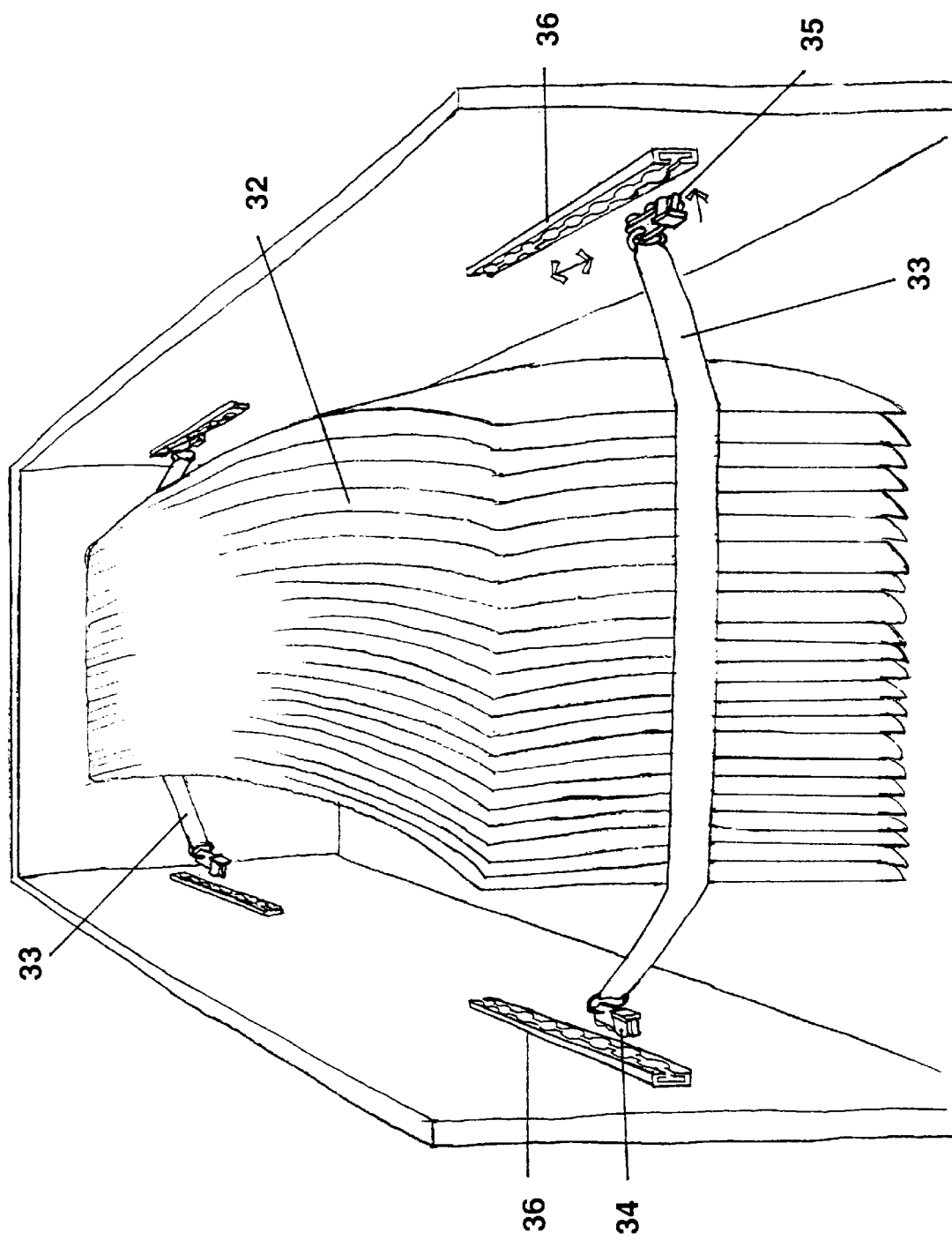
FIG. 11 is an open end perspective view of a loaded container of the present invention, detailing the lateral bracing strap system present in a preferred embodiment.

FIG. 4 also indicates that there is a flat plastic loop 30 located at the top of the front struts 20 which accepts a 2 inch wide strap 25 attached to the rear 5 of the container. As illustrated in both FIGS. 4 and 10, the two rear struts 20 are connected by a crossbar 23 along their tops. At the center of the crossbar, there is a pin connection 31 to the block and tackle 24. Once the windshields have been loaded, the front struts 20 are locked into position along the base rail 22 and the straps 25 placed through the loops 30 at their tops. Then, as the front struts 20 are held in a vertical position, the straps 25 are secured with Velcro strips along their length. When the straps 25 have been secured, the operator may pull on the free end of the block and tackle 24 rope, thereby lifting the windshields into their vertical transport position. While in the vertical transport position, the windshields are held, in compression, between the telescopic struts 20. As mentioned above, this system effectively transfers any force applied to the front side 6 or back side 5 of the container to the struts 20 and away from the windshields 32, decreasing the probability of damage during handling.

Once the windshields 32 have been loaded, the front panel 6 placed, and the windshields 32 lifted into their vertical transport position, the windshields 32 will be braced against longitudinal movement by the placement of straps 33 which will extend between the front 6 and back side 5 walls. The straps 33 will be fixed in length and will have cargo restraint fittings 34, 35 at each end which can reversibly fit into a track 36 containing multiple fitting stop positions attached to the front 6 and back side 5 walls. To ensure that the straps 33 are not lost during collapse and return of the container, it is preferable that the fitting at one end of the strap, for example, the strap which attaches to the front side panel 34, can be adjusted but not removed. The other end's fitting 35 can be adjustably positioned along a cargo restraint track 36 in order to accommodate different windshield lengths. The preferred embodiment utilizes a Series L fitting and track arrangement obtained from the Kindyne Corporation, located in North Branch, N.J.

Those skilled in the art will realize that the present invention can be modified to take on various sized and shape cargo. As such, examples of the use of the present invention as a 35 inch collapsible container and a 50 inch collapsible container are provided but are not examples of limitation.

EXAMPLE 1

35 Inch Container Disassembly Procedure

Working in a clean, level area, cut tie-wraps, remove container top (held in place by friction or snaps) and place nearby. The glass load and the internal components of the present invention are now visible. At each end, inside of the container, there is a strap 33 which braces the windshields against longitudinal movement during shipping. At the strap attachment at the rear of the container 35, there is a fitting with a spring loaded button located at its top center. Pulling down on this button will release the fitting from the track. The detached fitting should latch into the track 36 at the center of the front side 6 and the fitting on the front side 34 should be slid to the end of the track 36, pulling the strap 33 taunt, thus ensuring the straps 33 are not lost and are kept clear of the windshields 32 as they are unloaded. Located just above the glass during transport is a pulley operated block and tackle 24. Remove the block and tackle rope 37 from cleat 38 by pulling up on the rope 37, which will release it from between the locking gears and allow the rope 37 to slide through the tackle 24. The weight of the windshields will cause them to move from the vertical transport position back to a loading or unloading position of approximately 7° from vertical, towards the back 5 of the container.

Remove the pin 31 located on the crossbar 23 which holds the tackle 24 in its operating position, pull the tackle 24 away and place the pin 31 back into its hole 40. Place the tackle 24 on the Velcro located at the bottom of the inside face of the front side (not shown). Be sure the end of the rope 37 is held secure within the retention cleat 38. Release the front side 6 from the container by lifting up on the latching rod tabs 16 located at each end of the panel, disengaging the latching rod hooks 11 from the recesses 12. Pull the top edge of the front side 6 away, rotating it along its bottom edge until the panel is approximately 15° from vertical, and pull it up from the base 7.

While holding the front 6 of the container, walk around to the back 5 of the container and, using the same latch mechanism that held the panel in place in front, place the front side 6 onto the back side 5 of the container and push down on the latching rod tabs 16, locking the front side 6 onto the back side 5 of the container. Place the top 1 of the container over the front panel 6. Walk around to the front of the container, which will now be open. Remove the straps 25 from the top of the two telescoping struts 20 located at the front of the container. Place the straps 25 over the back of the container, out of the work area.

Pull on the track adjuster release lever 27 holding the bottom of the telescoping struts 20 at the front of the container in place, releasing the struts 20 from their position. Pull the struts 20 forward in the tracks 22 and relock. Rotate the locking ring 21 on each of the struts 20, collapse the struts 20 to their shortest length and reset locking ring 21. Rotate each strut 90 degrees towards the center of the container at their base, and fold the struts 20 into their storage position between the load support rails 22.

Unload glass 32. Pull up on the ends of the crossbar 23 between the telescopic struts 20 at the rear of the container, thereby releasing it. Place the crossbar 23 between the load support rails 22 at the bottom rear of the container base. Release the lever 27 on clamp on the sleeve of the telescopic struts 20 located at the rear of the container, collapse the struts to their shortest lengths, and rotate the struts 90 degrees towards the center of the container and fold into their storage position between the load support rails 22. Pull the straps 25 back into the container, so that they are hanging inside the back of the container. Fold the straps 25 in half by affixing the Velcro which runs along its length.

Located at the rear of the container, there are two hinged rear strut props 28 just below the top of the back side 5. Pull up on the lower portion of the hinged prop 43 to draw the pegs 29 at its base from their slots 44 in the back side. Allow the prop 28 to hang from its top hinge 45. Affix with Velcro. Move to either the left or right side of the container.

Lift the latching rod tab 16 located at the top of the back side, placing the rod 10 in an unlocked position, which allows the end 4 to move independently of the back side 5. Fold back the top extension of the end 4 away from the interior of the container 180° so it lies flat against the end wall, then fold the end wall 90° degrees into the body of the container. As the second end 4 is folded into its collapsed position, the operator will have to support the back side 5 of the container so it remains upright. Fold the back side 5 (and the attached front side 6 and top 1) down into the body of the container. The container can then be secured in its collapsed position with plastic tie straps (not shown).

EXAMPLE 2

50 Inch Container Disassembly Procedure

The same process outlined in Example 1 would be applicable to the collapse of a 50 inch container, with the following variation in steps. First, when attaching the front side 6 to the back side 5, it will be necessary to secure all three latching rods 10. The top 1 will not be able to fit onto the back 5 of the container during the collapsing steps, but should be placed away from the process until the final step discussed below. Before the end walls 4 have been folded into the body of the container, the extensions of the sides must be removed from both the front and back side by lifting the two top latching rod tabs 10. Then the end walls 4 are folded into the container. The back side panel 5 (and the attached front side 6) is folded into the bottom 7. The side extensions 3 are then fitted into the slots 18 on either side of the bottom 7, which are identical to the slots 18 present on the top of the sides 5, 6. The short lower portion of the extension forms the upper part of the vertical sides of the collapsed container while the long upper portion of the extension is folded into the center of the container. After both extensions are in place, the top 1 is placed on top of the collapsed container, and it can be secured in this position with plastic tie straps (not shown).

What is claimed is:

1. A reusable shipping container having an assembled and collapsed form, said container comprising a bottom, a top, two ends and two sides; where, when in said collapsed form said sides and said ends are stored between said top and said bottom, said container further comprising
    a. a first means for connecting said sides and said ends when the container is in said assembled form, comprising a latching rod located in a cavity of either said side or said end, said rod comprising a plurality of hooks where vertical displacement of said latching rod engages and disengages said hooks with recesses present in either said side or said end thereby connecting and disconnecting said sides with said ends;
    b. a second means for connecting said sides and said bottom when the container is in said assembled form;
    c. a third means for connecting said ends to said bottom when the container is in said assembled form.

2. The container of claim 1 such that the means for connecting can connect a first side of said container with a second side of said container when said first side is connected to one or more ends of said container.

3. The container of claim 1 wherein said second and third means for connecting comprises a hinge mechanism, and said ends fold inwardly into said bottom.

4. The container of claim 3 wherein said rear struts are maintained a desired distance from the rear side of said container with a rear strut prop, said prop position being adjustable in coordination with said prop position.

5. The container of claim 1 comprising a mechanism inside said container to pull, maintain, and protect a load within said container in a vertical shipping position, said mechanism comprising two front struts and two rear struts, where said front struts are connect by a first means to the rear side of said container and said rear struts are connected by a second means to the front side of said container, wherein all components of said mechanism can be stored between the top and bottom of said container when it is in its collapsed form.

6. The container of claim 5 wherein said first means are cargo straps and said second means is a block and tackle secured to a cross-bar where said cross-bar connects said two rear struts.

7. The container of claim 1 comprising a lateral bracing strap system comprising two cargo straps located within the container, one of said straps at either end, where the ends of said cargo strap are fitted into a track comprising multiple stop positions, where said track is attached to either the front side, the rear side, or both the front and rear side of said container.

8. The container of claim 1 wherein the ratio between the volume of said collapsed state and the volume of said assembled state is in the range of about 1:2.6 to about 1:3.2.

9. The container of claim 1 wherein said sides and said ends comprise extensions which increase the height of said sides and ends, and said extensions are connected to said sides and said ends by hinge mechanisms, such that any container having said extensions has the same volume in said collapsed state.

10. The container of claim 1 wherein said bottom and said top nest such that containers in either their assembled or collapsed state can be stacked upon each other.

11. A reusable shipping container having an assembled and collapsed form, said container comprising a bottom, a top, two ends and two sides; where, when in said collapsed form said sides and said ends are stored between said top and said bottom, said container further comprising
    a. sides and ends connected by a means comprising a latching rod located in a cavity of either said side or said end, said rod comprising a plurality of hooks where vertical displacement of said latching rod engages said hooks with recesses present in either said side or said end thereby connecting said sides with said ends when the container is in said assembled form;
    b. a front side reversibly connected to said bottom by tabs positioned at equal distances along the bottom edge of said side which fit into grooves positioned at equal distances along the top edge of said bottom when the container is in said assembled form;
    c. a back side connected to said bottom by a hinge mechanism such that said side folds down into said bottom when said container is in said collapsed form;
    d. two ends connected to said bottom by a hinge mechanism such that said ends fold down into said bottom when said container is in said collapsed form.

12. The container of claim 11 wherein the hinge mechanism of said ends is a toggle hinge.

13. The container of claim 12 wherein the ratio between the volume of said collapsed state and the volume of said assembled state is in the range of about 1:2.6 to about 1:3.2.

14. The container of claim 12 wherein said sides and said ends comprise extensions which increase the height of said sides and ends, and said extensions are connected to said sides and said ends by hinge mechanisms, such that any container having said extensions has the same volume in said collapsed state.

15. The container of claim 11 comprising a mechanism inside said container to pull and maintain a load within said container in a vertical shipping position, said mechanism comprising two front struts and two rear struts, where said front struts are connect by a first means to the rear side of said container and said rear struts are connected by a second means to the front side of said container, wherein all components of said mechanism can be stored between-the top and bottom of said container when it is in its collapsed form.

16. The container of claim 15 wherein said first means are cargo straps and said second means is a block and tackle secured to a cross-bar where said cross-bar connects said two rear struts.

17. The container of claim 15 comprising a lateral bracing strap system comprising two cargo straps located within the container, one of said straps at either end, where the ends of said cargo strap are fitted into a track comprising multiple stop positions, where said track is attached to either the front side, the rear side, or both the front and rear side of said container.

18. The container of claim 15 wherein said rear struts are maintained a desired distance from the rear side of said container with a rear strut prop, said prop position being adjustable in coordination with said strut position.

19. The container of claim 15 wherein said bottom and said top nest such that containers in either their assembled or collapsed state can be stacked upon each other.

* * * * *